US011258980B2

(12) United States Patent
Fujiki et al.

(10) Patent No.: US 11,258,980 B2
(45) Date of Patent: Feb. 22, 2022

(54) VIDEO SIGNAL TRANSMITTING DEVICE, VIDEO SIGNAL RECEIVING DEVICE, AND VIDEO SIGNAL TRANSMISSION AND RECEPTION SYSTEM

(71) Applicant: THINE ELECTRONICS, INC., Tokyo (JP)

(72) Inventors: Rei Fujiki, Tokyo (JP); Daisuke Iwama, Tokyo (JP); Shun Ideguchi, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 17/002,980

(22) Filed: Aug. 26, 2020

(65) Prior Publication Data
US 2021/0067737 A1 Mar. 4, 2021

(30) Foreign Application Priority Data
Aug. 28, 2019 (JP) ............................. JP2019-155571

(51) Int. Cl.
*H04N 7/08* (2006.01)
*H04N 5/44* (2011.01)
*H04N 7/18* (2006.01)

(52) U.S. Cl.
CPC ................. *H04N 7/08* (2013.01); *H04N 5/44* (2013.01); *H04N 7/183* (2013.01)

(58) Field of Classification Search
CPC ...... H04N 7/08; H04N 1/00098; H04N 7/081; H04N 7/10; H04N 7/04; H04N 5/44; H04N 7/183; H04N 7/15; H04N 7/147; H04N 21/43632; H04N 5/38; H04N 5/04; H04N 5/21; H04N 5/23212; H04N 5/23245; H04N 7/18; H04L 5/0091; H03H 7/09
See application file for complete search history.

(56) References Cited

U.S. PATENT DOCUMENTS 5,587,743 A * 12/1996 Montgomery ..... H04N 1/00098
 348/473
6,914,637 B1 * 7/2005 Wolf .................. H04N 21/2383
 348/473

(Continued)

FOREIGN PATENT DOCUMENTS

JP 2007-103647 A 4/2007

*Primary Examiner* — Paulos M Natnael
(74) *Attorney, Agent, or Firm* — Sughrue Mion, PLLC

(57) ABSTRACT

The video signal transmission and reception system performs transmission of a video signal and a control signal between the video signal transmitting device and the video signal receiving device via a common transmission line. The video signal transmitting device includes a video signal transmitter, a control signal transmitter and receiver, a filter circuit, a controller, and a camera. The video signal receiving device includes a video signal receiver, a control signal transmitter and receiver, a filter circuit, and a controller. By performing time management control performed by the controller or the controller such that the period of the transient state of transmission of the video signal is within the non-communication period of the control signal, interference between the video signal and the control signal in the period of the transient state of transmission of the video signal is suppressed.

8 Claims, 8 Drawing Sheets

(56) References Cited

U.S. PATENT DOCUMENTS

| | | | | |
|---|---|---|---|---|
| 7,295,578 B1* | 11/2007 | Lyle | ............................ | G06F 3/14 |
| | | | | 348/473 |
| 7,558,326 B1* | 7/2009 | Lyle | ...................... | H04L 1/0057 |
| | | | | 348/469 |
| 2005/0114901 A1* | 5/2005 | Yui | ..................... | H04N 21/4135 |
| | | | | 725/100 |
| 2011/0004909 A1* | 1/2011 | Ogi | ........................ | H04N 7/088 |
| | | | | 725/81 |
| 2014/0269860 A1* | 9/2014 | Brown | ..................... | H04B 3/54 |
| | | | | 375/219 |
| 2019/0037173 A1* | 1/2019 | Lee | ........................ | H04W 76/15 |

* cited by examiner

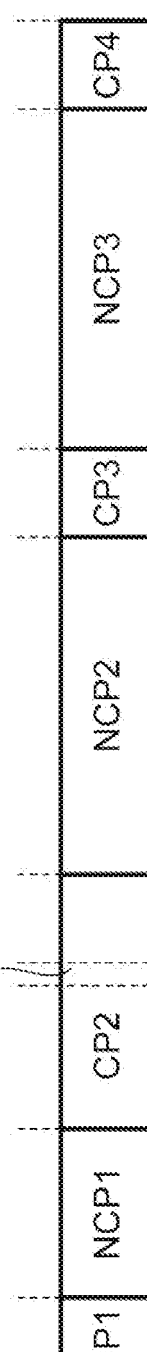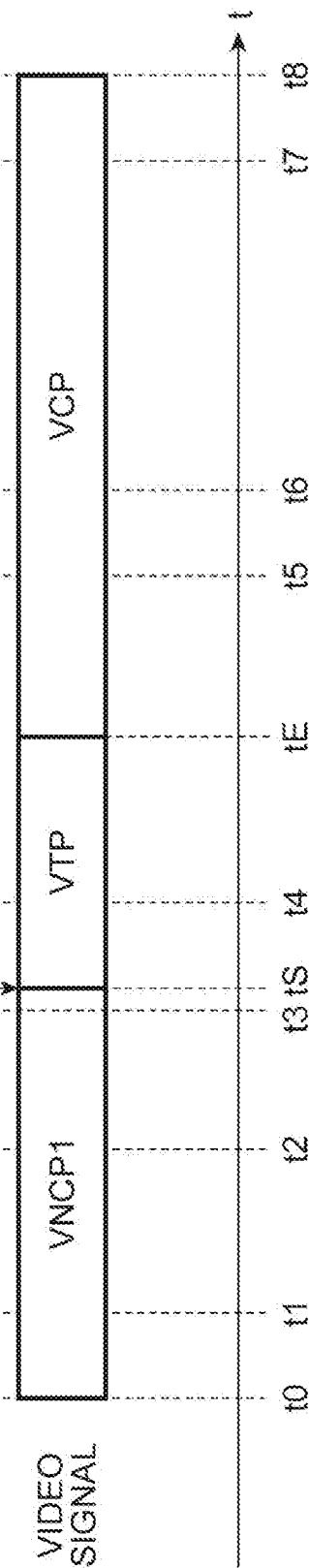

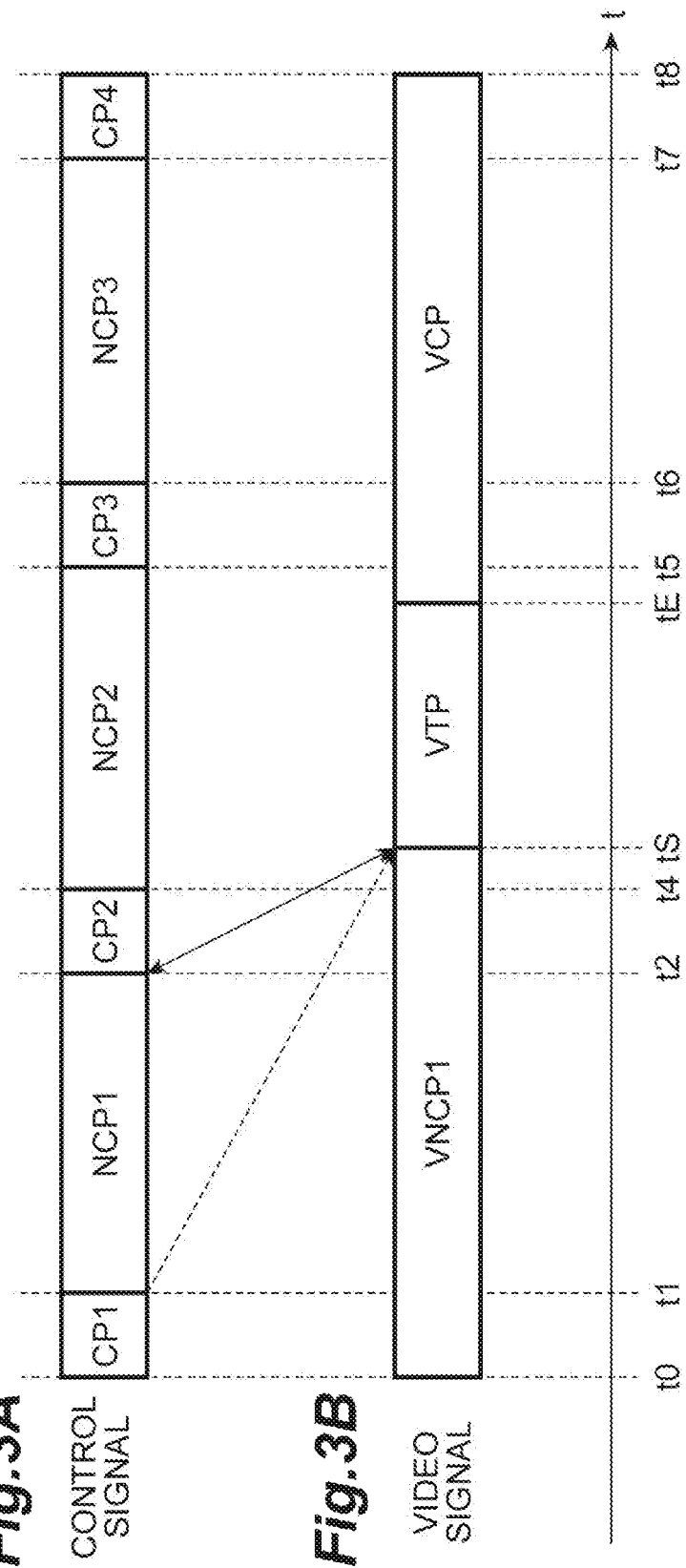

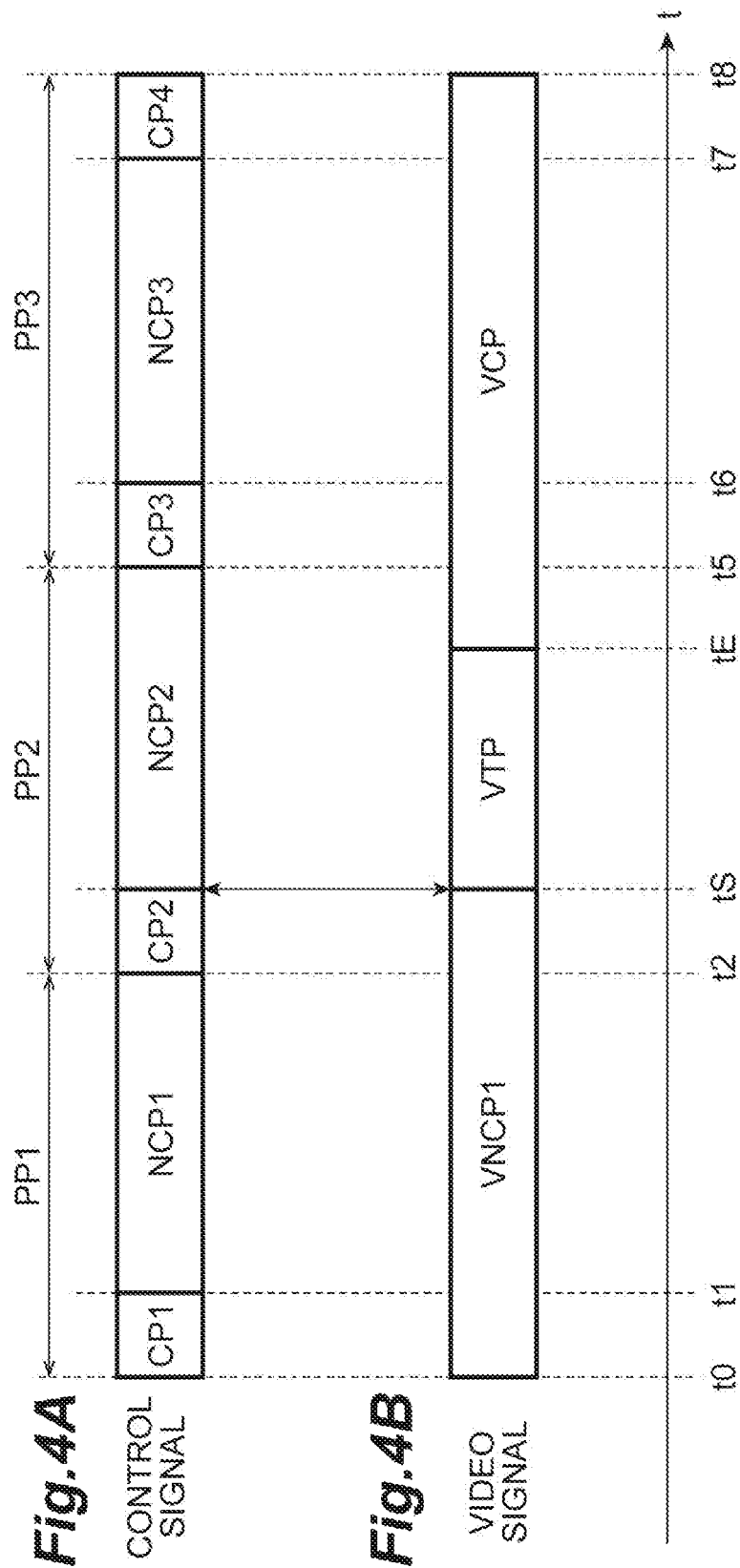

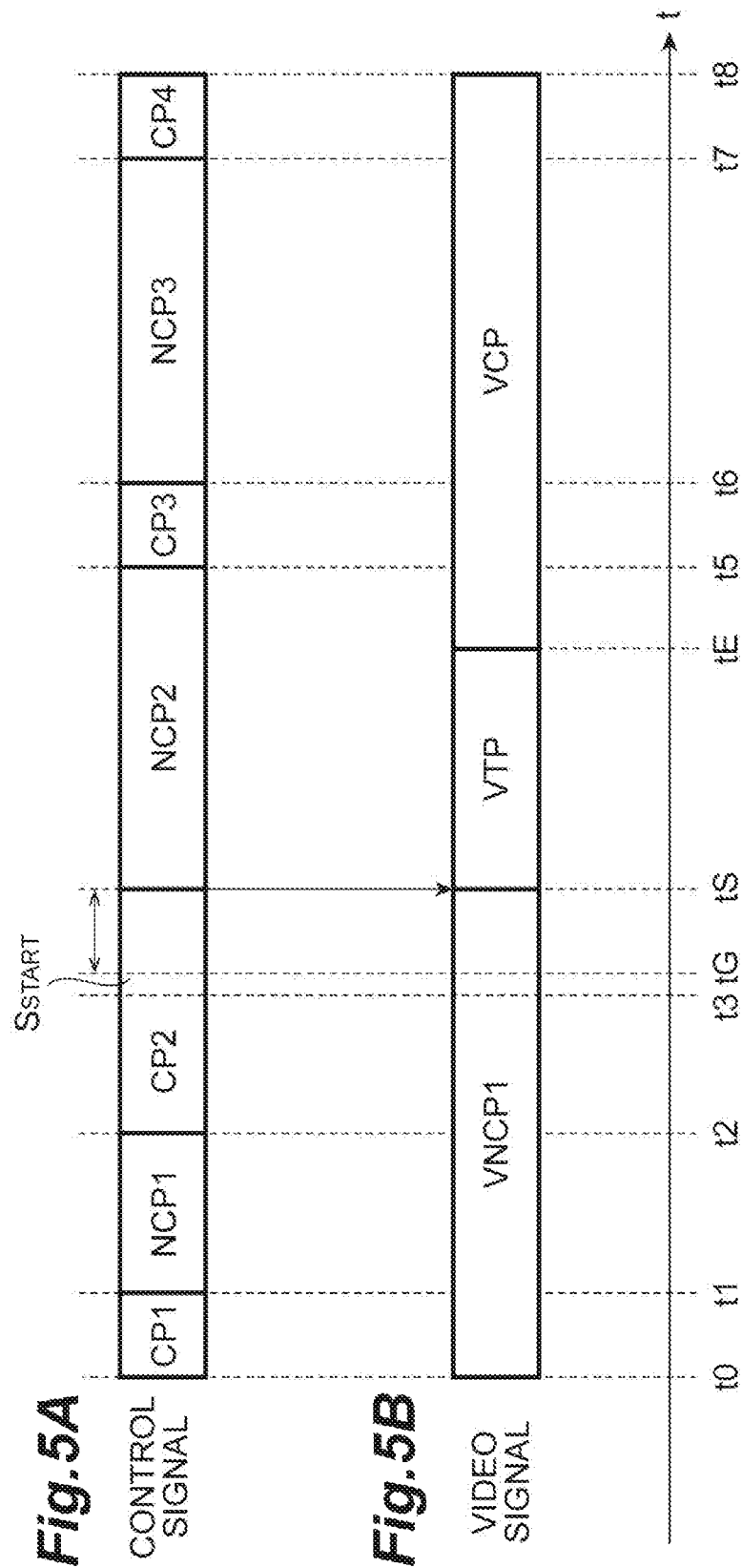

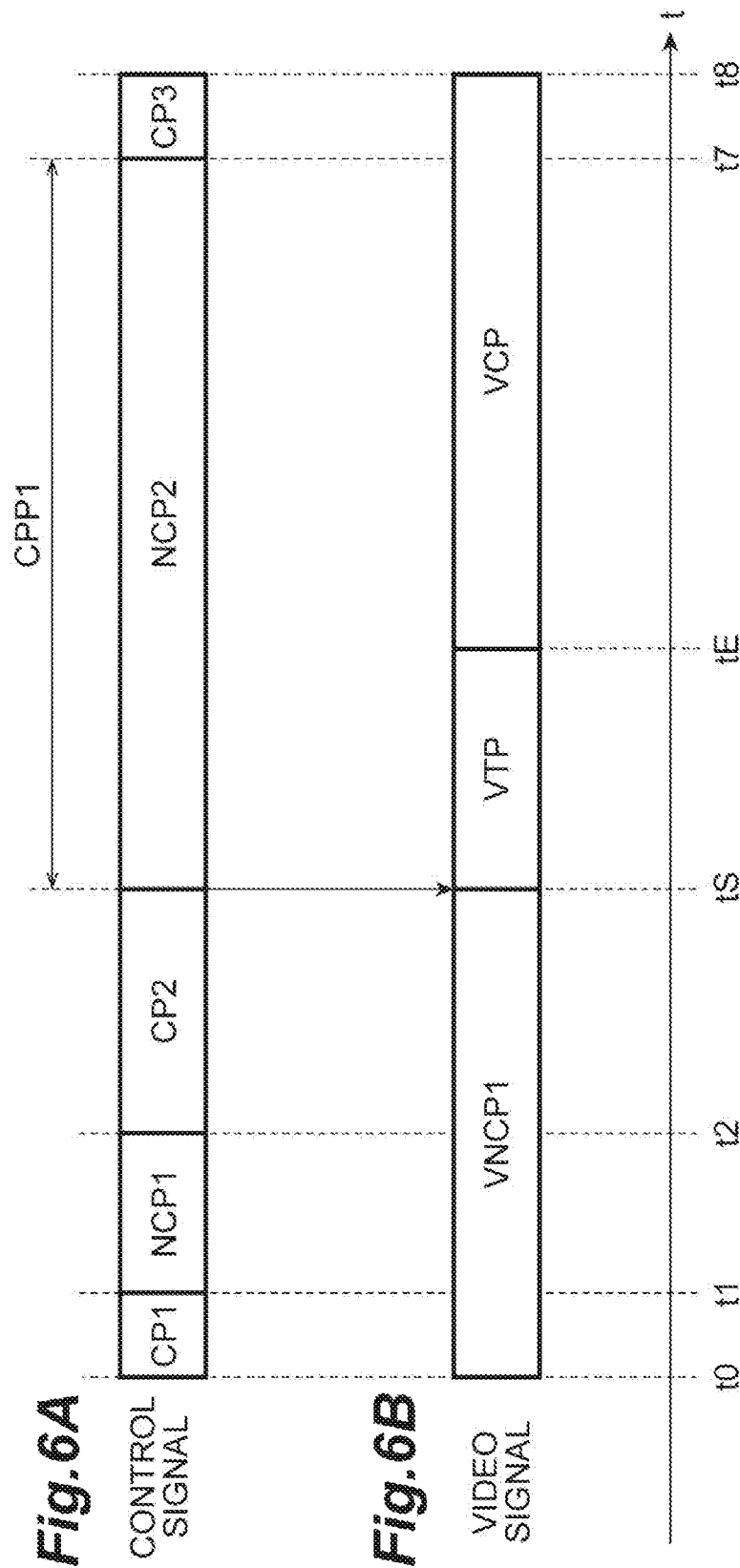

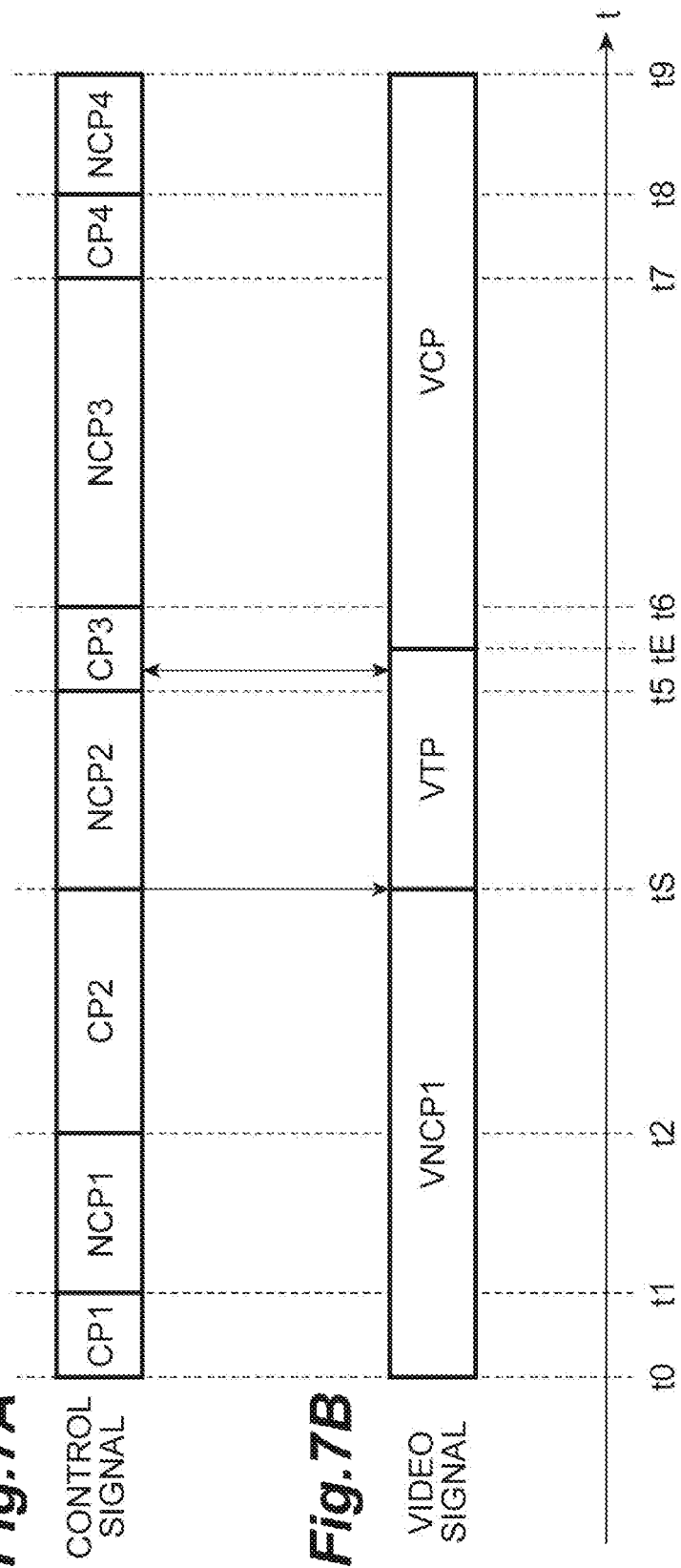

VIDEO SIGNAL TRANSMITTING DEVICE, VIDEO SIGNAL RECEIVING DEVICE, AND VIDEO SIGNAL TRANSMISSION AND RECEPTION SYSTEM

TECHNICAL FIELD

The present invention relates to a video signal transmitting device, a video signal receiving device, and a video signal transmission and reception system.

BACKGROUND

In recent years, cameras have been installed in various places. For example, cameras are installed at various places in a production line of a factory to monitor the production status and the like, and thus it is possible to take prompt action when a trouble occurs in the production line. Even in the medical field, for example, a camera is provided at the tip of the endoscope to monitor the inside of the patient's body, and thereby the patient can be appropriately treated according to the monitoring result. In addition, multiple on-vehicle cameras are installed in passenger cars to monitor traffic conditions in the surrounding area, thereby contributing to improvement in safe driving.

As can be seen from these examples, while it is necessary for the camera to be installed at a place where the target object can be imaged, in general cases, a video signal processing unit, which processes the video signal acquired through imaging performed by the camera and displays the video, may be installed at a position separated from the camera by a certain distance. Therefore, it is necessary to transmit the video signal acquired through imaging performed by the camera to the video signal processing unit over a long distance. In addition, it is desirable to transmit a video signal by a wired transmission line rather than a wireless transmission line from the viewpoint of storage of the amount of information obtained by uncompressed video and robustness against disturbance.

Normally, in cameras, it is a top priority that an image sensor, which is a central device, operates without delay. In addition, an image sensor usually has multiple functions and can be set in various ways. Therefore, the camera captures an image with the image sensor after the image sensor is appropriately set. There is a demand for the camera to acquire a video with less noise and to acquire a video with less deterioration than normal temperature even at the high temperature limit of the operating temperature range, for example. For this reason, there is a demand for a high degree of completion of the analog electronic circuit that processes the analog signal which is output through imaging performed by the image sensor. The analog signal processed by the analog electronic circuit is converted into a digital signal by the AD conversion circuit. On the other hand, a logic electronic circuit, which performs image processing calculation or the like on a digital signal in order to convert the signal into an image that is natural to the naked eye, is often disposed outside the camera (for example, the above-mentioned video signal processing unit).

In such a case, it is necessary to perform appropriate setting, which is obtained from the outside, on the image sensor in detail according to the imaging environment that changes from moment to moment. A control signal for issuing an instruction to perform the setting will be sent from a position separated from the camera by a certain distance. The transmission line for transmitting the control signal may have a long distance like the transmission line for transmitting the video signal described above.

Imaging performed by an image sensor of a camera is becoming higher in definition with an increase in the number of pixels, and is also becoming higher in speed with an increase in a refresh rate. As a result, the amount of data that has to be transmitted as a video signal per unit time increases, and thus the video signal is transmitted at a higher frequency.

Compared to the video signal, the control signal has a smaller amount of data that has to be transmitted per unit time and may be transmitted at a low frequency. Since the interval between one imaging operation performed by the camera and the next imaging operation is short, the same imaging environment is often continued. Thus, it is not necessary to frequently change the setting of the image sensor. Further, even in a case where the setting of the image sensor is changed, not only the frequency of the change may be small, but also the number of items to be changed may be small.

Conventionally, by providing a transmission line for video signals and a transmission line for control signals separately, full-duplex communication of high-speed video signals and low-speed control signals has been realized. However, in the case where two transmission lines are provided in this way, compared to the case where one transmission line is provided, not only the cost increases due to the increase in necessary members, but also the probability that a defect may occur due to a work mistake in the processing and finishing work for connecting a cable, which forms the transmission line, to connector brackets at the end points is simply doubled.

In order to reduce costs and reduce defects, it is desirable to transmit both high-speed video signals and low-speed control signals by using a common transmission line. In such a case, a filter circuit that separates or multiplexes the video signal and the control signal having different frequencies from each other is disposed on the transmission side and the reception side. The asymmetric digital subscriber line (ADSL) or the like is a technology realized by using the filter circuit (refer to Patent Document 1 below). Further, a coaxial line can be used as the transmission line in such a case. Since the cross-section structure of the coaxial line is kept constant along the longitudinal direction, the characteristic impedance for the signal can be kept constant along the longitudinal direction. Thus, the coaxial line can be suitable for transmission of high-speed signals such as video signals.

(Patent Document 1) Japanese Unexamined Patent Publication No. 2007-103647.

SUMMARY

Hereinafter, a device that transmits a video signal acquired through imaging performed by a camera is referred to as a video signal transmitting device, and a device that receives the video signal is referred to as a video signal receiving device. A control signal is sent from the video signal receiving device to the video signal transmitting device. In addition, in the video signal transmitting device that has received the control signal, required processing is performed based on the instruction of the control signal, and a signal (for example, a signal indicating the state of the video signal transmitting device) may be transmitted from the video signal transmitting device to the video signal receiving device based on the instruction of the control signal. Similar to the control signal, the signal may be transmitted at a low speed. Hereinafter, a low-speed signal sent from the video signal transmitting device to the video signal receiving device is also referred to as a control signal.

In a case where both the high-speed video signal and the low-speed control signal are transmitted using the common transmission line, there are the following problems. The filter circuit described above is composed of a plurality of passive components selected to obtain required operation characteristics. The operation characteristics of the filter circuit are designed to be optimum for the frequency, voltage, and noise state of the video signal in the steady state period, and the filter circuit cannot be dynamically switched.

In the period of the transient state after the transmission of the video signal from the video signal transmitting device to the video signal receiving device is started, the frequency, voltage, and noise state of the video signal may be different from those in the steady state period. Therefore, a filter circuit designed to obtain optimum operation characteristics in a steady state may cause a large amount of interference between a video signal and a control signal in a period of a transient state. As a result, the interference may cause a transmission error.

To deal with the interference problem, it is possible to add a filter for the transient state. However, in such a case, in a steady state, the load on the transmission line increases, and the transmission capacity decreases. This situation is not preferable.

Transmission errors due to interference may occur in both the video signal and the control signal. However, there is a serious problem in that the transmission error occurring in the control signal has a greater effect than that in the video signal.

Even in a case where a transmission error occurs on the video signal side, the video signal transmitting device and the video signal receiving device are able to return to the normal operation state in the transmission of the video signal by using the synchronization signal included in the video signal. Therefore, the period in which the transmission error affects the video signal transmission is limited to the period of the transient state. If the period in which the transmission error occurs is predicted in advance, it is possible to take measures such as discarding the video signal in the period in which the occurrence of error is predicted. Further, the adverse effect of the transmission error on the display of the video based on the video signal is reflected in the afterimage recognition ability of the viewer of the video in a case where the period of the transient state is short. For this reason, even in a case where noise occurs in the video signal due to a transmission error, the noise may be allowed.

On the other hand, the occurrence of a transmission error in the control signal is often not allowed, unlike the case of the video signal. In general, the control signal for issuing an instruction to perform the setting of the image sensor is not repeatedly transmitted with the same content. Therefore, in a case where a transmission error occurs in the control signal, the setting of the image sensor becomes unintended setting. As a result, all the subsequent video signals become unintended signals, and the video may be broken. For example, assuming a case where imaging is started after the image sensor is initialized with a certain setting by the instruction of the control signal, in a case where the transmission error occurs in the control signal, the initialization of the image sensor may fail, all subsequent videos may be broken. Further, every time a control signal for issuing an instruction to change the setting of the image sensor is transmitted thereafter, a transient state of video signal transmission occurs, which may cause a transmission error in the control signal again. Occurrence of such chained transmission errors may cause a situation in which the image sensor cannot reach the correct setting as intended.

As described above, there is a serious problem in that the transmission error occurring in the control signal has a greater effect than that in the video signal. In the above, the problem in the case where the image sensor is initialized with a certain setting by the instruction of the control signal and the imaging is started has been described. Similar problems may occur in a case where the operation condition of the image sensor and the transmission condition of the video signal are changed to other settings by the instruction of the control signal.

The present disclosure shows a video signal transmitting device and a video signal receiving device capable of prevent a control signal transmission error from occurring when transmitting a video signal and a control signal via a common transmission line. Further, a video signal transmission and reception system including such a video signal transmitting device and a video signal receiving device is shown.

There is provided a video signal transmitting device that performs transmission of a video signal and a control signal with a video signal receiving device via a common transmission line, the video signal transmitting device including: (1) a video signal transmitter that transmits a video signal to the video signal receiving device; (2) a control signal transmitter and receiver that transmits and receives a control signal to and from the video signal receiving device; and (3) a controller that adjusts timing of start of transmission of the video signal, or timing of condition change of the video signal by the video signal transmitter to suppress interference between the video signal and the control signal in a period of a transient state of transmission of the video signal.

In the video signal transmitting device, it is preferable that the controller permits the video signal transmitter to start transmission of the video signal or change the condition of the video signal after the period of transmission and reception of the control signal of the control signal transmitter and receiver. Further, the controller may detect that the control signal received by the control signal transmitter and receiver includes a signal for instructing the video signal transmitter to start transmission of the video signal or change the condition of the video signal. Even in such a case, it is preferable to permit the video signal transmitter to start the transmission of the video signal of the video signal or to change the condition of the video signal after the period of transmission and reception of the control signal performed by the control signal transmitter and receiver.

There is provided a video signal receiving device that performs transmission of a video signal and a control signal with a video signal transmitting device via a common transmission line, the video signal receiving device including: (1) a video signal receiver that receives a video signal from the video signal transmitting device; (2) a control signal transmitter and receiver that transmits and receives a control signal to and from the video signal transmitting device; and (3) a controller that suppresses interference between the video signal and the control signal in a period of a transient state of transmission of the video signal by causing the control signal transmitter and receiver to adjust a period of transmission and reception of the control signal.

In the video signal receiving device, it is preferable that the controller sets the length of the period of non-transmission of the control signal by the control signal transmitter and receiver to be longer than the period of the transient state of the transmission of the video signal. Further, it is preferable that the controller prohibits the control signal transmitter and receiver from transmitting and receiving the control signal in the period of the transient state of transmission of the video signal, and permits the control signal transmitter and receiver to transmit and receive the control signal after the period of the transient state of transmission of the video signal.

The video signal transmission and reception system includes a video signal transmitting device and a video signal receiving device. Either or both of the video signal transmitting device and the video signal receiving device are as described above.

According to the above device, it is possible to prevent a control signal transmission error from occurring when both the video signal and the control signal are transmitted through the common transmission line.

BRIEF DESCRIPTION OF THE DRAWINGS

FIGS. 2A and 2B are diagrams for explaining the transmission periods of the control signal and the video signal of the comparative example.

FIGS. 3A and 3B are diagrams for explaining the transmission periods of the control signal and the video signal of the present embodiment.

FIGS. 4A and 4B are diagrams illustrating a first example of time management of transmission periods of control signals and video signals according to the present embodiment.

FIGS. 5A and 5B are diagrams illustrating a second example of time management of transmission periods of control signals and video signals according to the present embodiment.

FIGS. 6A and 6B are diagrams illustrating a third example of time management of transmission periods of control signals and video signals according to the present embodiment.

FIGS. 7A and 7B are diagrams illustrating a fourth example of time management of transmission periods of control signals and video signals according to the present embodiment.

DETAILED DESCRIPTION

Hereinafter, embodiments for carrying out the present invention will be described in detail with reference to the accompanying drawings. In the description of the drawings, the same elements will be denoted by the same reference symbols, without redundant description. The present invention is not limited to these exemplifications, but is defined by the scope of the claims, and is intended to include meanings equivalent to the scope of the claims and all modifications within the scope.

Figure 1:
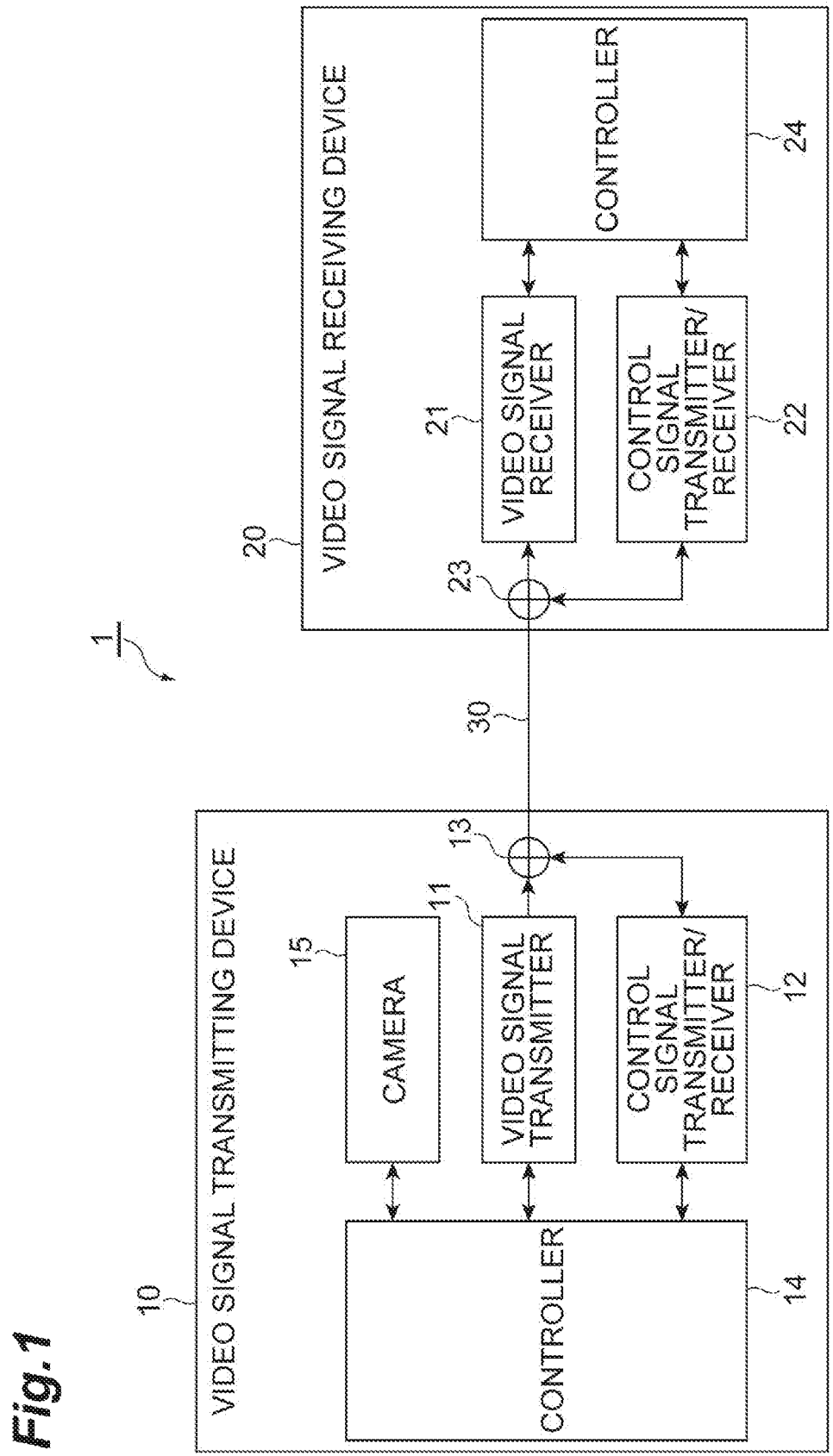
FIG. 1 is a diagram illustrating a configuration of a video signal transmission and reception system 1.

FIG. 1 is a diagram illustrating a configuration of a video signal transmission and reception system 1. The video signal transmission and reception system 1 includes a video signal transmitting device 10 and a video signal receiving device 20 that are connected to each other through a transmission line 30. The video signal transmission and reception system 1 performs transmission of a video signal and a control signal between the video signal transmitting device 10 and the video signal receiving device 20 via a common transmission line 30.

The video signal transmitting device 10 includes a video signal transmitter 11, a control signal transmitter and receiver 12, a filter circuit 13, a controller 14, and a camera 15. The controller 14 controls the video signal transmitter 11, the control signal transmitter and receiver 12, and the camera 15, and receives signals therefrom.

The camera 15 includes an image sensor such as a CCD sensor or a CMOS sensor, a drive circuit that drives the image sensor, a read circuit that reads data from the image sensor, and a lens system that forms an image on the light receiving surface of the image sensor. The camera 15 captures an image under the control of the controller 14 and sends the video signal data obtained by the image capturing to the controller 14.

The video signal transmitter 11 includes a phase locked loop (PLL) circuit, an output buffer circuit, and the like. The video signal transmitter 11 receives the video signal from the controller 14, and outputs the video signal to the filter circuit 13 under the control of the controller 14.

Under the control of the controller 14, the control signal transmitter and receiver 12 receives the control signal arrived from the filter circuit 13 and outputs the control signal to the controller 14. The control signal arrived from the filter circuit 13 includes, for example, a command for setting the condition of the operation of the camera 15 or the transmission of the video signal performed by the video signal transmitter 11, a command for issuing an instruction to perform polling for monitoring the state of the camera 15, a command for issuing an instruction for an event to be performed in a case where a situation occurs, and the like. It should be noted that the case where a situation occurs includes, for example, a case where the camera is zoomed during operation for the purpose of controlling the video signal transmission and reception system 1 or a case where change in environment with a different brightness due to the environmental factor is detected and the exposure time setting of is changed.

The control signal transmitter and receiver 12 also outputs a signal to the filter circuit 13 under the control of the controller 14. The signal transmitted from the control signal transmitter and receiver 12 to the filter circuit 13 includes, for example, a signal for transmitting information obtained as a result of polling to the video signal receiving device 20. Similar to the control signal, such a signal may be transmitted at a low speed. A low-speed signal sent from the video signal transmitting device to the video signal receiving device is also called a control signal.

The filter circuit 13 is connected to the video signal transmitter 11, the control signal transmitter and receiver 12, and the transmission line 30. The filter circuit 13 is configured to include an inductor and a capacitor which are passive components. The operation characteristics of the filter circuit are designed to be optimum for the frequency, voltage, and noise state of the video signal in the period of the steady state.

The filter circuit 13 separates or multiplexes a high-speed video signal and a low-speed control signal. The filter circuit 13 outputs the video signal arrived from the video signal transmitter 11 to the transmission line 30, outputs the control signal arrived from the control signal transmitter and receiver 12 to the transmission line 30, and outputs the control signal arrived from the transmission line 30 to the control signal transmitter and receiver 12.

The video signal receiving device 20 includes a video signal receiver 21, a control signal transmitter and receiver 22, a filter circuit 23, and a controller 24. The controller 24 controls the video signal receiver 21 and the control signal transmitter and receiver 22 and receives signals therefrom.

The video signal receiver 21 includes an input buffer circuit, a clock data recovery (CDR) circuit, and the like. The video signal receiver 21 receives the video signal from the filter circuit 23 and outputs the video signal to the controller 24. Under the control of the controller 24, the control signal transmitter and receiver 22 outputs the control signal to the filter circuit 23, receives the control signal arrived from the filter circuit 23, and outputs the control signal to the controller 24.

The filter circuit 23 is connected to the video signal receiver 21, the control signal transmitter and receiver 22, and the transmission line 30. The filter circuit 23 has the same configuration as the filter circuit 13. The filter circuit 23 outputs the video signal arrived from the transmission line 30 to the video signal receiver 21, outputs the control signal arrived from the transmission line 30 to the control signal transmitter and receiver 22, and outputs control signal arrived from the control signal transmitter and receiver 22 to the transmission line 30.

The video signal obtained through imaging performed by the camera 15 of the video signal transmitting device 10 is sent from the video signal transmitter 11 to the transmission line 30 via the filter circuit 13, and is transmitted to the video signal receiving device 20 via the transmission line 30. The video signal arrived at the video signal receiving device 20 via the transmission line 30 is received by the video signal receiver 21 via the filter circuit 23.

The control signal which is output from the control signal transmitter and receiver 22 of the video signal receiving device 20 is sent to the transmission line 30 via the filter circuit 23, and is transmitted to the video signal transmitting device 10 via the transmission line 30. The control signal arrived at the video signal transmitting device 10 via the transmission line 30 is received by the control signal transmitter and receiver 12 via the filter circuit 13. On the contrary, the control signal which is output from the control signal transmitter and receiver 12 of the video signal transmitting device 10 is sent to the transmission line 30 via the filter circuit 13, and is transmitted to the video signal receiving device 20 via the transmission line 30. The control signal arrived at the video signal receiving device 20 via the transmission line 30 is received by the control signal transmitter and receiver 22 via the filter circuit 23.

In general, the video signal is continuously sent from the video signal transmitting device 10 to the video signal receiving device 20 via the transmission line 30 in a long period from the start of imaging performed by the camera 15. On the other hand, the control signal is not continuously transmitted between the video signal transmitting device 10 and the video signal receiving device 20 in a long period, but is transmitted in a short communication period which is intermittently repeated.

FIGS. 2A and 2B are diagrams for explaining the transmission periods of the control signal and the video signal of the comparative example. As illustrated in FIG. 2A, for the control signal, the communication periods (CP1, CP2, CP3, CP4) and the non-communication periods (NCP1, NCP2, NCP3) are alternately repeated. The communication period CP2 in FIG. 2A is an initialization control communication period. In the middle of the control signal sent from the video signal receiving device 20 to the video signal transmitting device 10 in a certain communication period (CP2), a command ($S_{START}$) for issuing the instruction to start imaging and video signal transmission performed by the camera 15 may be included. In such a case, the command ($S_{START}$) is received and the imaging performed by the camera 15 is started, and at the same time, the video signal transmission from the video signal transmitting device 10 to the video signal receiving device 20 is also started. It should be noted that FIG. 2B shows a video signal non-communication period (VNCP1) (time t0 to t3) before activation of the video signal transmitter 11 in response to the command input, a video signal transmission period (VTP) (time tS to tE) in an activation/transition period of the video signal transmitter 11, and a video signal transmission period (VCP) (time tE to t8) in which steady communication is performed. However, in the period of the transient state (tS to tE) from the start of transmission of the video signal to the steady state (after time tE), the control signal may be sent from the video signal receiving device 20 to the video signal transmitting device 10. In such a case, interference between the video signal and the control signal becomes large, which causes a transmission error. Transmission errors due to interference may occur in both the video signal and the control signal. However, the transmission error occurring in the control signal has a greater effect than that in the video signal.

FIGS. 3A and 3B are diagrams for explaining the transmission periods of the control signal and the video signal of the present embodiment. As illustrated in FIG. 3A, communication periods (CP1, CP2, CP3, CP4) of the control signal and non-communication periods (NCP1, NCP2, NCP3) of the control signal are set alternately. As illustrated in FIG. 3B, the following periods are set: a video signal non-communication period (VNCP1) (time t0 to tS) before activation of the video signal transmitter 11 in response to the command input; a video signal transmission period (VTP) (time tS to tE) in an activation/transition period of the video signal transmitter 11; and a video signal transmission period (VCP) (time tE to t8) in which steady communication is performed. The video signal transmission period (VTP) is set after the end time (t1) of the first communication period (CP1) of the control signal and after the end time (t4) of the next communication period (CP2), and is set within the non-communication period (NCP2) of the control signal.

As illustrated in FIGS. 3A and 3B, in the present embodiment, the controller 14 or the controller 24 performs time management control such that the period of the transient state of transmission of the video signal (VTP) (time tS to tE) is within the non-communication period (NCP2) (time t4 to t5) of the control signal. Thereby, interference between the video signal and the control signal in the period of the transient state of transmission of the video signal (VTP) (time tS to tE) is suppressed. That is, while full-duplex communication is performed in the period of the steady state of transmission of the video signal (VCP) (time tE to t8), half-duplex communication is performed in the period of the transient state of transmission of the video signal (VTP) (time tS to tE).

At this time, the controller 14 in the video signal transmitting device 10 may perform the time management control. In such a case, the controller 14 adjusts the timing of the start of transmission of the video signal or the condition change of the video signal performed by the video signal transmitter 11. Preferably, the controller 14 gives permission to start the transmission of the video signal performed by the video signal transmitter 11 (time tS) or change the condition of the video signal after the period (CP1, CP2) of the transmission and reception of the control signal performed by the control signal transmitter and receiver 12. Further, the controller 14 may detect that the control signal received by the control signal transmitter and receiver 12 includes a signal for issuing an instruction to start the transmission or change the condition of the video signal performed by the video signal transmitter 11. Even in such a case, after the period (CP1, CP2) of transmission and reception of the control signal performed by the control signal transmitter and receiver 12, the video signal transmitter 11 gives permission to start the transmission of the video signal (time tS) or change the condition of the video signal. It should be noted that the condition change of the video signal includes, for example, setting change of the resolution or the refresh rate of the image sensor, change having an effect on the video signal frequency such as spread spectrum clocking, change having an effect on the video signal voltage such as change of the voltage amplitude setting of the video signal, and the like. The information for the condition change of the video signal can be included in the control signal. The condition change processing of the video signal can be performed by the video signal transmitter 11, for example.

Alternatively, the controller 24 in the video signal receiving device 20 may perform time management control. In such a case, the controller 24 adjusts the period of communication of the control signal performed by the control signal transmitter and receiver 22. Preferably, the controller 24 sets the length of the non-communication period (NCP2) of the transmission and reception of the control signal performed by the control signal transmitter and receiver 22 to be longer than the period of the transient state of transmission of the video signal (VTP). Further, the controller 24 prohibits the control signal transmitter and receiver 22 from transmitting and receiving the control signal in the period of the transient state of transmission of the video signal (VTP) (non-communication period NCP2), and permits the control signal transmitter and receiver 22 to transmit and receive the control signal after the period of the transient state of transmission of the video signal (VTP) (after time tE) (communication period CP3).

Either one of the time management control using the controller 14 and the time management control using the controller 24 may be performed, or both may be performed.

The length of the period of the transient state (VTP) after the start of transmission of the video signal or the condition change of the video signal can be defined as a time required until the operation of the PLL circuit or the output buffer circuit included in the video signal transmitter 11 is stabilized. The time management control can be performed by setting the non-communication period (NCP2) of the control signal longer than the period of the transient state of transmission of the video signal (VTP).

By sending a command for issuing an instruction to perform polling as a control signal from the video signal receiving device 20 to the video signal transmitting device 10, the presence or absence of an internal processing error of the video signal transmitting device 10 and the operating condition may be monitored, and the information of the monitoring result may be sent as a control signal from the video signal transmitting device 10 to the video signal receiving device 20. However, it suffices that the monitoring is performed in a case where the video signal transmission and reception system 1 is in a steady state. Thus, the monitoring may be permitted even in a case where the monitoring cannot be performed in the period of the transient state of transmission of the video signal. In the polling, the host device periodically makes inquiries to each device, and performs transmission and reception and various kinds of processing in a case where the condition of each device satisfies a predetermined condition.

FIGS. 4A and 4B are diagrams illustrating a first example of time management of transmission periods of control signals and video signals according to the present embodiment.

As illustrated in FIG. 4A, the communication periods (CP1, CP2, CP3, CP4) of the control signal including the command for issuing an instruction to perform polling and the non-communication periods (NCP1, NCP2, NCP3) of the control signal are set alternately. As illustrated in FIG. 4B, the following periods are set: a video signal non-communication period (VNCP1) (time t0 to tS) before activation of the video signal transmitter 11; a video signal transmission period (VTP) (time tS to tE) in an activation/transition period of the video signal transmitter 11; and a video signal transmission period (VCP) (time tE to t8) in which steady communication is performed. The video signal transmission period (VTP) is set after the end time (tS) of the communication period (CP2) of the control signal, and is set within the non-communication period (NCP2) of the control signal.

The present example is an example in a case where it is permitted for the system to lengthen the non-communication period of polling control. In such a case, the controller 24 of the video signal receiving device 20 sets the non-communication period (NCP2) of the control signal such that the period is longer than the time (the period in which the transmission of the video signal is in the transient state (VCT)) required until the transmission of the video signal is stabilized. Further, in a case where the controller 14 of the video signal transmitting device 10 does not start the transmission of the video signal performed by the video signal transmitter 11 in the communication period (CP2) of the control signal, and gives permission to start the transmission of the video signal performed by the video signal transmitter 11 (time tS) in a case where the communication period (CP2) of the control signal ends. As a result, the transmission and reception of the control signal is prevented from being affected by the transient state of transmission of the video signal, and the regular polling control communication intervals (PP1, PP2, PP3) are maintained. Therefore, there is no delay in monitoring the intended state.

FIGS. 5A and 5B are diagrams illustrating a second example of time management of transmission periods of control signals and video signals according to the present embodiment.

As illustrated in FIG. 5A, communication periods (CP1, CP2, CP3, CP4) of the control signal and non-communication periods (NCP1, NCP2, NCP3) of the control signal are set alternately. As illustrated in FIG. 5B, the following periods are set: a video signal non-communication period (VNCP1) (time t0 to tS) before activation of the video signal transmitter 11; a video signal transmission period (VTP) (time tS to tE) in an activation/transition period of the video signal transmitter 11; and a video signal transmission period (VCP) (time tE to t8) in which steady communication is performed. The video signal transmission period (VTP) is set after the end time (tS) of the communication period (CP2) of the control signal, and is set within the non-communication period (NCP2) of the control signal.

The present example is an example in the case where the controller 14 of the video signal transmitting device 10 detects that a command ($S_{START}$) for issuing the instruction to start imaging performed by the camera 15 and video signal transmission is included in the middle of the control signal sent from the video signal receiving device 20 to the video signal transmitting device 10 within a certain communication period (CP2). In such a case, in a case where the controller 14 of the video signal transmitting device 10 does not start the transmission of the video signal performed by the video signal transmitter 11 in the communication period (CP2) of the control signal, and gives permission to start the transmission of the video signal performed by the video signal transmitter 11 (time tS) in a case where the communication period (CP2) of the control signal ends. Thereby, even in a case where the control signal is sent from the video signal receiving device 20 to the video signal transmitting device 10 after the controller 14 detects a command for issuing the instruction to start the imaging performed by the camera 15 and the video signal transmission. Since the video signal transmission is not started in the communication period (CP2) of the control signal, a control signal transmission error is avoided.

FIGS. 6A and 6B are diagrams illustrating a third example of time management of transmission periods of control signals and video signals according to the present embodiment.

As illustrated in FIG. 6A, the control signal communication periods (CP1, CP2, CP3) and the non-communication period of the control signals (NCP1, NCP2) are set alternately. As illustrated in FIG. 6B, the following periods are set: a video signal non-communication period (VNCP1) (time t0 to tS) before activation of the video signal transmitter 11; a video signal transmission period (VTP) (time tS to tE) in an activation/transition period of the video signal transmitter 11; and a video signal transmission period (VCP) (time tE to t8) in which steady communication is performed. The video signal transmission period (VTP) is set after the end time (tS) of the communication period (CP2) of the control signal, and is set within the non-communication period (NCP2) of the control signal.

The present example is an example in a case where it is permitted for the system to temporarily lengthen the non-communication period of polling control. It is assumed that the controller 24 of the video signal receiving device 20 detects the start of transmission of the video signal at the end time (time tS) of the communication period (CP2) of the control signal including the command for polling control. In a case where the controller 24 of the video signal receiving device 20 detects the start (time tS) of transmission of the video signal, the time period (non-communication period NCP2) from the start of the transmission to the start (time t7) of communication of the control signal performed by the control signal transmitter and receiver 22 is set to be longer than the period of the transient state of transmission of the video signal (video signal transmission period (VTP)).

Alternatively, in a case where the controller 24 of the video signal receiving device 20 detects the start of transmission of the video signal, the controller 24 prohibits the control signal transmitter and receiver 22 from transmitting and receiving the control signal in the period of the transient state of transmission of the video signal (VTP) (communication prohibition period (CPP1)), and permits the control signal transmitter and receiver 22 to transmit and receive the control signal, after the period of the transient state of transmission of the video signal (VTP). Thereby, the time for avoidance of occurrence of interference can be intentionally controlled and can be set to include the margin.

FIGS. 7A and 7B are diagrams illustrating a fourth example of time management of transmission periods of control signals and video signals according to the present embodiment.

As illustrated in FIG. 7A, communication periods (CP1, CP2, CP3, CP4) of the control signal and non-communication periods (NCP1, NCP2, NCP3, NCP4) of the control signal are set alternately. As illustrated in FIG. 7B, the following periods are set: a video signal non-communication period (VNCP1) (time t0 to tS) before activation of the video signal transmitter 11; a video signal transmission period (VTP) (time tS to tE) in an activation/transition period of the video signal transmitter 11; and a video signal transmission period (VCP) (time tE to t9) in which steady communication is performed. The video signal transmission period (VTP) is set after the end time (tS) of the communication period (CP2) of the control signal. The end time (tE) of the video signal transmission period (VTP) is set within the communication period (CP3) after the end time (t5) of the non-communication period (NCP2) of the control signal. In the overlap period between the communication period (CP3) and the video signal transmission period (VTP), the control signal and the video signal may slightly interfere with each other. In the non-communication period (NCP2), the interference between the control signal and the video signal is avoided.

As shown in the drawing, even in a case where the video signal transmission is in a transient state and has not yet reached the steady state, when the frequency, voltage, and noise state of the video signal approaches the steady state to the extent that the control signal transmission error due to the interference between the video signal and the control signal can be avoided, transmission and reception of the control signal may be started. Thereby, the non-communication period of the control signal can be shortened. Therefore, it is possible to prevent omission of state monitoring and time loss, and it is possible to perform more rapid control.

Figure 8:
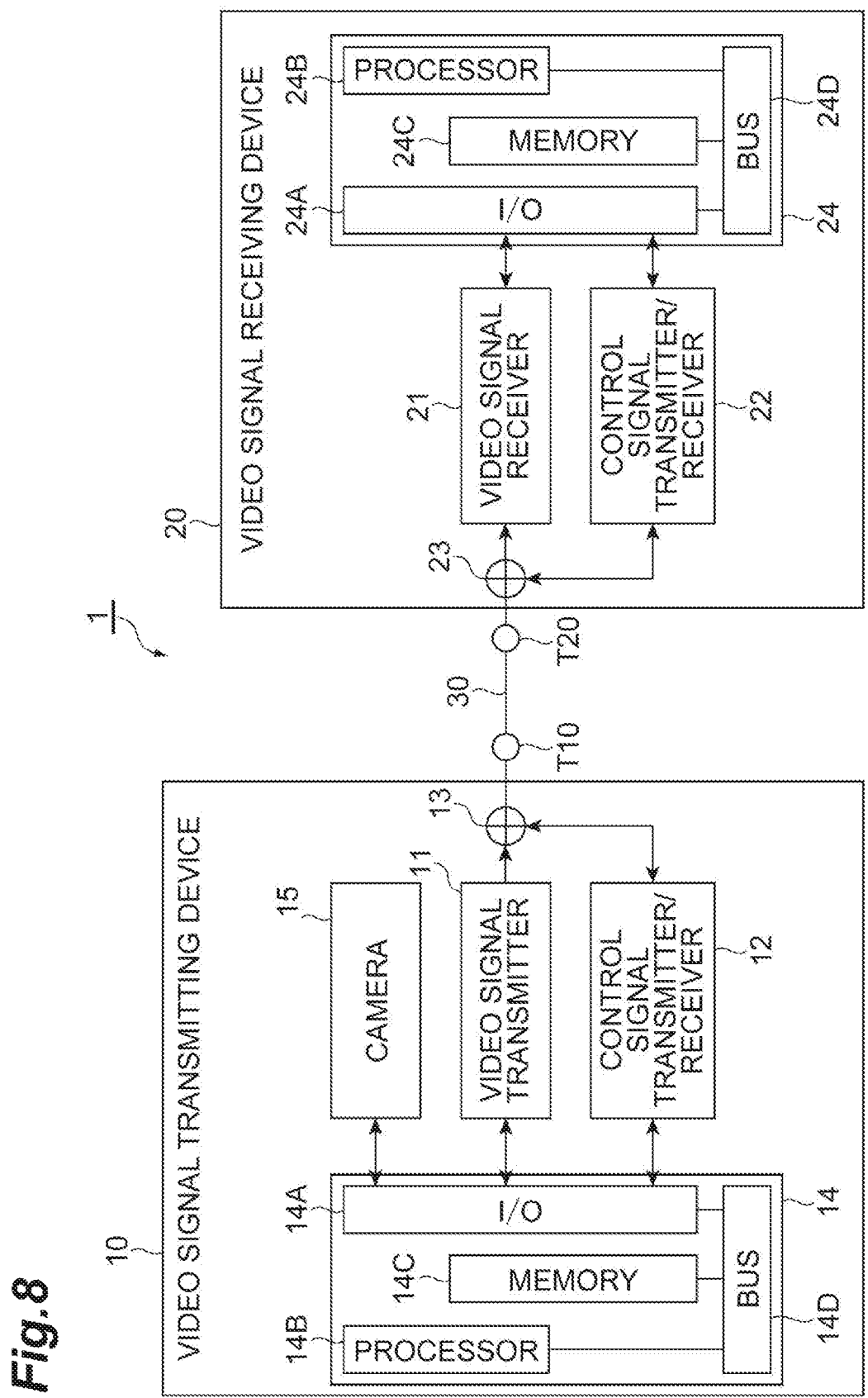
FIG. 8 is a diagram illustrating a more specific example of the video signal transmission and reception system 1 illustrated in FIG. 1.

FIG. 8 is a diagram illustrating a more specific example of the video signal transmission and reception system 1 illustrated in FIG. 1.

The controller 14 illustrated in FIG. 1 can be composed of, for example, a microcomputer. The controller 14 includes an input/output interface (I/O) 14A, a processor 14B such as a central processing unit (CPU), a memory 14C, and a bus 14D. The input/output interface 14A, the processor 14B, and the memory 14C are electrically connected via the bus 14D. The processor 14B executes the above-mentioned processing via the input/output interface 14A based on the program stored in the memory 14C.

The controller 24 illustrated in FIG. 1 can be composed of, for example, a microcomputer. The controller 24 includes an input/output interface (I/O) 24A, a processor 24B such as a central processing unit (CPU), a memory 24C, and a bus 24D. The input/output interface 24A, the processor 24B, and the memory 24C are electrically connected via the bus 24D. The processor 24B executes the above-mentioned processing via the input/output interface 24A based on the program stored in the memory 24C.

The video signal transmitting device 10 includes an input/output terminal T10 between the filter circuit 13 and the transmission line 30. The video signal receiving device 20 includes an input/output terminal T20 between the filter circuit 23 and the transmission line 30.

As described above, the above-described video signal transmission and reception system 1 includes the video signal transmitting device 10, the video signal transmitter 11, the control signal transmitter and receiver 12, the filter circuit 13, the controller 14, the camera 15, the video signal receiving device 20, the video signal receiver 21, the control signal transmitter and receiver 22, the filter circuit 23, the controller 24, and the transmission line 30.

The processor 24B of the controller 24 on the reception side generates a control signal including a request command (R) in a case where a predetermined condition is satisfied based on the program stored in the memory 24C. The control signal is transmitted to the control signal transmitter and receiver 22 via the bus 24D and the input/output interface 24A. At this time, the control signal transmitter and receiver 22 functions as a transmitter, and transmits the control signal to the filter circuit 13 via the filter circuit 23, the input/output terminal T20, the transmission line 30, and the input/output terminal T10. Each filter circuit (23, 13) can function as a splitter that separates a video signal and a control signal when receiving a signal, and can function as a mixer that combines these signals when transmitting a signal.

The filter circuit 13 transmits the received control signal to the control signal transmitter and receiver 12. The control signal transmitter and receiver 12 transmits the control signal to the interface 14A, and transmits the transmitted control signal to the processor 14B via the bus 14D. Therefore, the control signal transmitter and receiver 12 is a control signal receiver and also a control signal transmitter. The processor 14B executes processing according to the program stored in the memory 14C based on the request command (R) indicated by the received control signal.

In a case where the request command (R) included in the control signal is "start of transmission of the video signal", for example, the processor 14B determines whether the current time is in the non-communication period NCP2 of control signal (period in which video signal can be transmitted). Information on the type of the current communication period is assumed to be stored in the memory 14C.

In a case where the determination result is "YES", the processor 14B transmits a transmission instruction signal to the video signal transmitter 11 via the bus 14D and the input/output interface 14A. The transmission instruction signal includes an instruction to transmit the video signal, which is output from the camera 15 to the video signal receiving device 20, via the transmission line 30.

If the determination result is "NO", the processor 14B transmits a transmission prohibition signal to the video signal transmitter 11 via the bus 14D and the input/output interface 14A. The transmission prohibition signal includes an instruction not to transmit the video signal, which is output from the camera 15 to the video signal receiving device 20, via the transmission line 30. Other setting methods can be considered as a method of adjusting the timing of start of the transmission of the video signal. For example, a setting method, in which the end time (tS) of the communication period (CP2) of the control signal stored in the memory 14C is acquired and the video signal is started immediately after the end time, and the like also can be considered.

In a case where the request command (R) included in the control signal is "condition change of video signal", for example, the processor 14B determines whether the current time is in the non-communication period NCP2.

In a case where the determination result is "YES", the processor 14B transmits a condition change instruction signal to the specific device via the bus 14D and the input/output interface 14A. The specific device is, for example, the video signal transmitter 11, and the content indicated by the condition change instruction signal is, for example, a change in resolution of the video signal. In a case where the condition change is performed while the video signal is being transmitted, fluctuation occurs in the video signal due to a transient phenomenon. In a case where the video signal is in a transient state, it is not preferable that the control signal interferes with the video signal. Within the non-communication period NCP2 of the control signal, the control signal is not affected even when the video signal is in a transient state. In addition, the video signal transmitter 11 can include a video signal processor that performs the above-described plurality of kinds of processing corresponding to the condition change. The video signal transmitter 11 can also have a function of changing the imaging condition of the image sensor in the camera 15.

In a case where the above determination result is "NO", the processor 14B does not transmit the condition change instruction signal to the specific device via the bus 14D and the input/output interface 14A. In such a case, the video signal being transmitted from the video signal transmitter 11 does not fluctuate and enter a transient state. Therefore, interference between the video signal and the control signal can be suppressed.

As described above, the video signal transmitting device 10 is a video signal transmitting device including the video signal transmitter 11 that is connected to the common terminal T10 via the filter circuit 13, and the control signal receiver 12 (transmitter and receiver) that is connected to the common terminal T10 via the filter circuit 13. The video signal transmitting device 10 is operable in the half-duplex communication mode within an initial period (VTP) immediately after the start of transmission of the video signal, transmits a video signal from the common terminal T10, and does not receive a control signal from the common terminal T10.

Further, the video signal receiving device 20 is a video signal receiving device including the video signal receiver 21 that is connected to the common terminal T20 via the filter circuit 23, and the control signal transmitter 22 (transmitter and receiver) that is connected to the common terminal T20 via the filter circuit 23. The video signal receiving device is operable in the half-duplex communication mode within an initial period (VTP) immediately after the start of reception of the video signal, receives the video signal from the common terminal T20, and does not transmit the control signal from the common terminal T20.

What is claimed is:

1. A video signal transmitting device that performs transmission of a video signal and a control signal with a video signal receiving device via a common transmission line, the video signal transmitting device comprising:
   a video signal transmitter that transmits a video signal to the video signal receiving device;
   a control signal transmitter and receiver that transmits and receives a control signal to and from the video signal receiving device; and
   a controller that adjusts
      timing of start of transmission of the video signal, or
      timing of condition change of the video signal
   by the video signal transmitter to suppress interference between the video signal and the control signal in a period of a transient state of transmission of the video signal;
   wherein the controller gives permission to
      start the transmission of the video signal, or
      perform the condition change,
      by the video signal transmitter,
         after a period of transmission and reception of the control signal performed by the control signal transmitter and receiver;

wherein the controller gives permission to
start the transmission of the video signal, or
perform the condition change of the video signal,
by the video signal transmitter,
after a period of transmission and reception of the control signal performed by the control signal transmitter and receiver,
even in a case of detecting that the control signal received by the control signal transmitter and receiver includes a signal for issuing an instruction to
start the transmission of the video signal, or
perform the condition change of the video signal,
by the video signal transmitter.

2. A video signal transmission and reception system comprising:
the video signal transmitting device according to claim 1; and
a video signal receiving device that receives a video signal from the video signal transmitting device and transmits and receives a control signal to and from the video signal transmitting device.

3. A video signal receiving device that performs transmission of a video signal and a control signal with a video signal transmitting device via a common transmission line, the video signal receiving device comprising:
a video signal receiver that receives a video signal from the video signal transmitting device;
a control signal transmitter and receiver that transmits and receives a control signal to and from the video signal transmitting device; and
a controller that adjusts a period of transmission and reception of the control signal by the control signal transmitter and receiver to suppress interference between the video signal and the control signal in a period of a transient state of transmission of the video signal, both of the video signal and the control signal transmitting via the common transmission line,
wherein the video signal receiving device is operable in a full-duplex communication mode, receives the video signal from the common terminal, and transmits the control signal from the common terminal, in a period after an initial period, the initial period being set immediately after start of reception of the video signal.

4. The video signal receiving device according to claim 3, wherein the controller sets a length of a non-communication period of the control signal, which is performed by the control signal transmitter and receiver, to be longer than the period of the transient state of the transmission of the video signal.

5. The video signal receiving device according to claim 3, wherein the controller
prohibits the transmission and reception of the control signal performed by the control signal transmitter and receiver in the period of the transient state of the transmission of the video signal, and
gives permission to transmit and receive the control signal by the control signal transmitter and receiver after the period of the transient state of the transmission of the video signal.

6. A video signal transmission and reception system comprising:
the video signal receiving device according to claim 3; and
a video signal transmitting device that transmits a video signal to the video signal receiving device and transmits and receives a control signal to and from the video signal receiving device.

7. A video signal transmitting device comprising:
a video signal transmitter connected to a common terminal via a filter circuit; and
a control signal transmitter and receiver connected to the common terminal via the filter circuit,
wherein the video signal transmitting device is operable in a half-duplex communication mode, transmits a video signal from the common terminal, and does not receive a control signal from the common terminal, in an initial period immediately after start of transmission of the video signal; and
wherein the video signal transmitting device is operable in a full-duplex communication mode, transmits the video signal from the common terminal, and receives the control signal from the common terminal, in a period after the initial period,
wherein the device further comprises a controller that adjusts a period of transmission and reception of the control signal by the control signal transmitter and receiver to suppress interference between the video signal and the control signal in a period of a transient state of transmission of the video signal, both of the video signal and the control signal transmitting via the common transmission line.

8. A video signal receiving device comprising:
a video signal receiver connected to a common terminal via a filter circuit; and
a control signal transmitter and receiver connected to the common terminal via the filter circuit,
wherein the video signal receiving device is operable in a half-duplex communication mode, receives a video signal from the common terminal, and does not transmit a control signal from the common terminal, in an initial period immediately after start of reception of the video signal; and
wherein the video signal receiving device is operable in a full-duplex communication mode, receives the video signal from the common terminal, and transmits the control signal from the common terminal, in an initial period immediately after start of reception of the video signal,
wherein the device further comprises a controller that adjusts a period of transmission and reception of the control signal by the control signal transmitter and receiver to suppress interference between the video signal and the control signal in a period of a transient state of transmission of the video signal, both of the video signal and the control signal transmitting via the common transmission line.

* * * * *